(12) United States Patent
Konishi

(10) Patent No.: US 11,062,646 B2
(45) Date of Patent: Jul. 13, 2021

(54) INSPECTING DEVICE, INSPECTING METHOD, AND PROGRAM

(71) Applicant: OMRON Corporation, Kyoto (JP)

(72) Inventor: Yoshinori Konishi, Kyoto (JP)

(73) Assignee: OMRON Corporation, Kyoto (JP)

( * ) Notice: Subject to any disclaimer, the term of this patent is extended or adjusted under 35 U.S.C. 154(b) by 190 days.

(21) Appl. No.: 16/339,017

(22) PCT Filed: Oct. 24, 2017

(86) PCT No.: PCT/JP2017/038328
§ 371 (c)(1),
(2) Date: Apr. 3, 2019

(87) PCT Pub. No.: WO2018/110090
PCT Pub. Date: Jun. 21, 2018

(65) Prior Publication Data
US 2020/0043407 A1    Feb. 6, 2020

(30) Foreign Application Priority Data

Dec. 15, 2016 (JP) .............................. JP2016-243232

(51) Int. Cl.
*G09G 3/3208* (2016.01)
*G09G 3/34* (2006.01)

(52) U.S. Cl.
CPC ......... *G09G 3/3208* (2013.01); *G09G 3/3413* (2013.01); *G09G 2320/0693* (2013.01); *G09G 2360/148* (2013.01)

(58) Field of Classification Search
CPC ............... G09G 3/3208; G09G 3/3413; G09G 2320/0693; G09G 2360/148
See application file for complete search history.

(56) References Cited

U.S. PATENT DOCUMENTS 6,868,175 B1 * 3/2005 Yamamoto ............... G06K 9/00
382/143
9,176,004 B2 * 11/2015 Yin ........................ G01J 1/0271
(Continued)

FOREIGN PATENT DOCUMENTS

CN      1498341 A     5/2004
CN    101281302 A    10/2008
(Continued)

OTHER PUBLICATIONS

Google Scholar search results.*
(Continued)

*Primary Examiner* — Qun Shen
(74) *Attorney, Agent, or Firm* — Metrolex IP Law Group, PLLC

(57) ABSTRACT

An inspecting device includes: an image acquiring unit which acquires a light-emitting surface image as a photographed image of the light-emitting surface; an inspecting unit which sets an inspecting range in a position in the light-emitting surface image in which the failure may appear, generates a one-dimensional luminance profile representing change in a luminance value along the first side in the inspecting range, detects an extreme value in the luminance profile, calculates an evaluation value for evaluating the difference between adjacent extreme values, and determines the presence or absence of the failure on the basis of the evaluation value; and an output unit which output information obtained by the inspecting unit.

10 Claims, 10 Drawing Sheets

(56) References Cited

U.S. PATENT DOCUMENTS

| | | |
|---|---|---|
| 2003/0169341 A1 | 9/2003 | Kanai |
| 2005/0100206 A1 | 5/2005 | Imi |
| 2005/0264149 A1 | 12/2005 | Cok et al. |
| 2006/0061248 A1 | 3/2006 | Cok et al. |
| 2008/0238936 A1 | 10/2008 | Kim |
| 2009/0015825 A1 | 1/2009 | Chung |
| 2009/0174636 A1 | 7/2009 | Kohashikawa et al. |
| 2012/0026315 A1* | 2/2012 | Lee .................. G09G 3/006 348/92 |
| 2012/0188224 A1 | 7/2012 | Lee et al. |
| 2012/0327399 A1 | 12/2012 | Nagamine et al. |
| 2015/0022672 A1 | 1/2015 | Nagamine et al. |
| 2015/0302568 A1 | 10/2015 | Hirai et al. |
| 2016/0148582 A1* | 5/2016 | Chung .................. G09G 3/3611 345/89 |
| 2016/0358559 A1* | 12/2016 | Dunn .................... G09G 3/3413 |
| 2017/0074724 A1 | 3/2017 | Nagamine et al. |
| 2020/0043407 A1* | 2/2020 | Konishi ................ G01N 21/95 |

FOREIGN PATENT DOCUMENTS

| | | |
|---|---|---|
| CN | 101379546 A | 3/2009 |
| CN | 102842276 A | 12/2012 |
| CN | 104184974 A | 12/2014 |
| CN | 105047145 A | 11/2015 |
| JP | H11-014554 A | 1/1999 |
| JP | 2005-207808 A | 8/2005 |
| JP | 2015-042942 A | 3/2015 |
| TW | 200610424 A | 3/2006 |
| TW | I260558 B | 8/2006 |
| TW | I471553 B | 2/2015 |

OTHER PUBLICATIONS

English translation of the International Search Report("ISR") of PCT/JP2017/038328 dated Nov. 28, 2017.

English translation of the Written Opinion("WO") of PCT/JP2017/038328 dated Nov. 28, 2017.

Extended European search report dated Mar. 27, 2020 in a counterpart European patent application.

New European search report which replaces the previous search report dated Mar. 27, 2020 dated Apr. 16, 2020.

Office action dated Apr. 22, 2020, in a counterpart Chinese patent application.

* cited by examiner

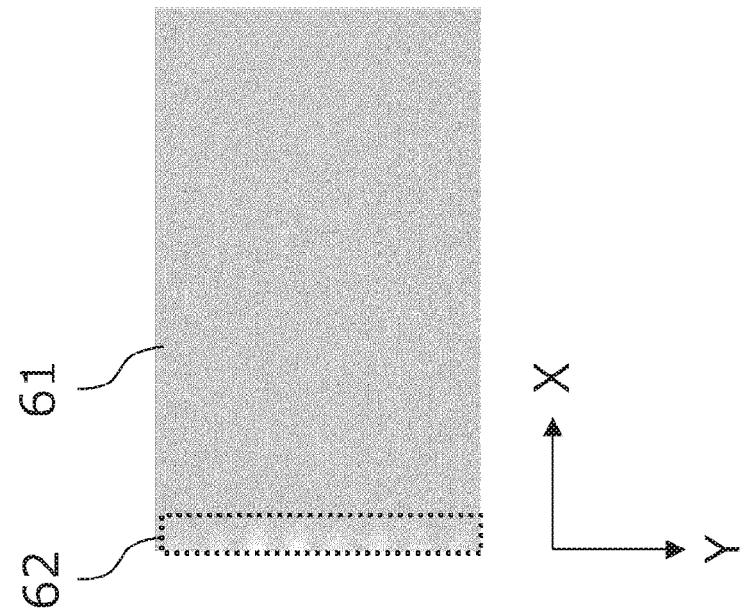
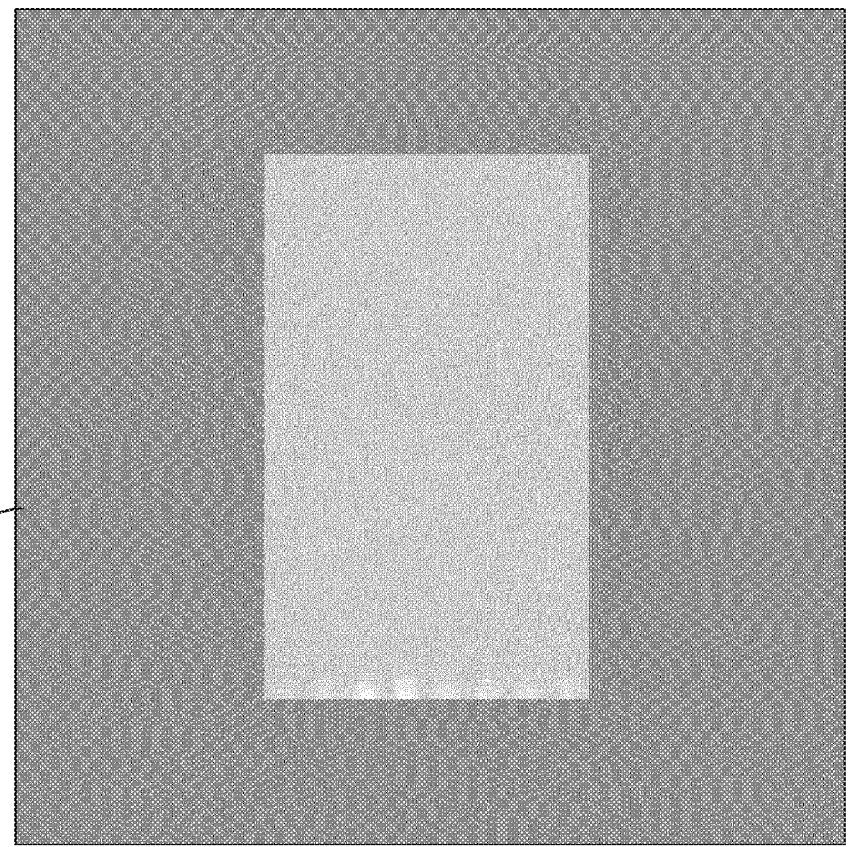

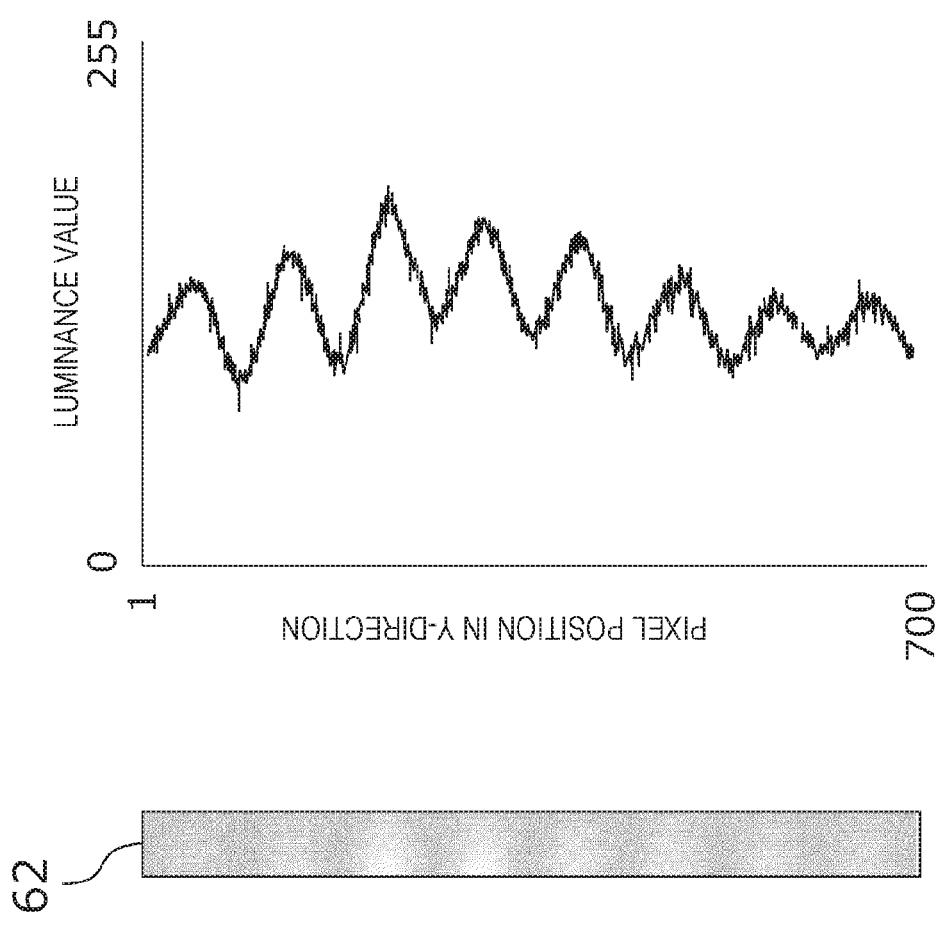

INSPECTING DEVICE, INSPECTING METHOD, AND PROGRAM

TECHNICAL FIELD

The present invention relates to a technique for inspecting an edge-lit type plane light source device for a failure.

BACKGROUND ART

An edge-lit type plane light source device is used as a backlight for a liquid crystal display device. The edge-lit type device includes light sources such as LEDs (Light Emitting Diodes) along an edge of the light-emitting surface of the plane light source device and is configured to guide light emitted from the light sources to the light-emitting surface by a plate-shaped light guide (called a light-guiding panel). The edge-lit type plane light source device can be relatively easily reduced in size/thickness and therefore has been widely used in small size electronic equipment such as a smart phone.

An edge-lit type plane light source device may be encountered with a failure related to luminance unevenness attributable to various causes such as a defect in a mold for a light-guiding panel or poor molding thereof, and shifting during assembly. In one such failure, a region close to a light source is locally brightened at an end on the side of the light-emitting surface provided with light sources, so that bright parts and dark parts are generated corresponding to the arrangement of the light sources. (Herein, the failure will be referred to as a "hot spot".)

At present, inspection of failures of this kind actually depends on visual sensory inspection carried out by a person (an inspector). Therefore, the inspection procedure may take time and trouble and can be costly or the results of the inspection depend much on personal skills, and there has been a demand for automation and objectification (quantification) of the inspection.

Note that PTL 1 proposes a method for automatically inspecting for a defect in a plain color sheet item such as paper and fabric or a defect in a liquid crystal panel by image processing though the document does not concern inspection of a plane light source device. According to the method, a photographed image of a test object is scanned using a filter which defines the luminance change of a defect (referred to as a "defect reference image" in the document), a normalized correlation coefficient is calculated, and a defective region in the image is detected.

CITATION LIST

Patent Literature

PTL 1: Japanese Patent Application Publication No. H11-14554

SUMMARY OF INVENTION

Technical Problem

In a hot spot as a failure specific to a plane light source device, luminance change (a brightness-darkness pattern) appears corresponding to the arrangement of light sources. If a filter in coincidence with the brightness-darkness pattern is prepared, the method disclosed in PTL 1 may be applied to inspection of a hot spot.

However, the size of the light-emitting surface, and the number, the pitch, and the arrangement of light sources may vary among different models of plane light source devices, and therefore according to the conventional method using filters, a lot of filters must be prepared according to expected brightness-darkness patterns. Stated differently, brightness-darkness patterns for which filters are not prepared cannot be detected or the detection accuracy may be greatly reduced. If scanning using a number of filters is carried out in order to inspect all the brightness-darkness patterns, the processing time required for detecting is prolonged.

With the foregoing in view, it is an object of the present invention to provide a technique for objectively and automatically inspecting an edge-lit type plane light source device for a failure related to luminance unevenness. Another object of the present invention is to provide a technique for inspecting a hot spot which is generally applicable to various models of plane light source devices.

Solution to Problem

In order to achieve the object, according to the invention, a new evaluation value (an evaluation index) for quantifying the occurrence degree of a hot spot. With an algorithm proposed according to the present invention, an evaluation value can be automatically calculated from a photographed image of the light-emitting surface of a plane light source device, and hot spot inspection can be carried out automatically on the basis of the evaluation value.

More specifically, an inspecting device according to a first aspect of the present invention inspects for a failure related to luminance unevenness in a light-emitting surface of a plane light source device, the plane light source device is an edge-lit type plane light source device having multiple light sources arranged along a first side of the light-emitting surface and a light-guiding panel which guides light emitted from the multiple light sources to the light-emitting surface, the failure is a brightness-darkness pattern corresponding to the arrangement of the multiple light sources appearing at an end of the light-emitting surface on the side of the first side, and the inspecting device includes an image acquiring unit which acquires a light-emitting surface image as a photographed image of the light-emitting surface, an inspecting unit which sets an inspecting range in a position in the light-emitting surface image in which the failure appears, generates a one-dimensional luminance profile representing change in a luminance value along the first side in the inspecting range, detects an extreme value in the luminance profile, calculates an evaluation value for evaluating the difference between adjacent extreme values, and determines the presence or absence of the failure on the basis of the evaluation value, and an output unit which outputs information obtained by the inspecting unit.

In this configuration, an evaluation value representing the occurrence degree of a hot spot can be calculated on the basis of a photographed image of the light-emitting surface of the plane light source device, and the presence/absence of a hot spot can be determined on the basis of the evaluation value. Therefore, objective and automatic inspection for hot spots may be performed. Furthermore, an evaluation value for evaluating the difference between adjacent extreme values in a one-dimensional luminance profile is used, and therefore evaluation independent of the pitch of a brightness-darkness pattern may be carried out. Therefore, the present invention may be generally applied to various models of plane light source devices among which the size of the light-emitting surface, the number, pitch, and the arrangement of light sources, and the like are different.

The inspecting unit may calculate the evaluation value for an extreme value of interest on the basis of the extreme value of interest and two adjacent extreme values. In this way, if the luminance in a region changes as if a bright part is sandwiched between dark parts or a dark part is sandwiched between bright parts, the region can be evaluated as a candidate for a failure.

The inspecting unit may calculate the evaluation value HS for the extreme value of interest by the following expression:

$$HS = \frac{\text{abs}(val2 - val1) + \text{abs}(vas2 - val3)}{val1 + 2 \times val2 + val3} \qquad [\text{Math. 1}]$$

where the extreme value of interest is val2, the two adjacent extreme values are val1 and val3. Note that abs( ) is a function used to obtain an absolute value. According to the expression, an evaluation value dependent on the size (AC component) of change in the luminance value rather than dependent on the size (DC component) of the luminance value itself can be obtained. Therefore, the present invention may be generally applied to various models of the plane light source devices with different brightness.

When the distance between adjacent extreme values is greater than an upper limit threshold value, the inspecting unit may not have to calculate the evaluation value for the extreme value or may determine that the failure does not exist in the position of the extreme value. This is because if the distance between the extreme values is sufficiently large, the luminance change is gentle, and therefore the change is hardly perceived as a failure. If the luminance change is noticeable but the distance between the extreme values is greatly larger than the expected light source pitch, it should be determined that the failure is attributable to a cause other than a hot spot.

When the distance between adjacent extreme values is smaller than a lower limit threshold value, the inspecting unit may not have to calculate the evaluation value for the extreme value or may determine that the failure does not exist in the position of the extreme value. When the distance between the extreme values is extremely small (for example when the distance between the extreme values is clearly smaller than the expected light source pitch), the failure is attributable to a cause other than a hot spot or a simple noise in measurement.

The output unit may output the evaluation value and a result of determination on the presence or absence of the failure. Since the result of determination is output, the presence/absence of a hot spot or whether the plane light source device is good or defective can be immediately determined. The evaluation value is also output, and therefore the reason for the result of determination can be checked, so that convincingness and objectivity about the determination result may improve.

The output unit may output an image obtained by superposing the light-emitting surface image or an image obtained by processing the light-emitting surface image with information representing the position in which the failure appears. The output of the superposed image allows the location of interest with a hot spot to be grasped intuitively and easily, which is useful in checking the actual product.

The output unit may output a luminance profile in the inspecting range. Since the luminance profile is output, the state of a brightness-darkness pattern or the luminance difference between the extreme values can be understood.

Note that the present invention may be implemented as an inspecting device or a hot spot quantifying device having at least a part of the described configuration and functions. The present invention may also be implemented as a detecting method, a control method for the detecting device, or a hot spot quantifying method including at least a part of the above processing, a program which allows a computer to execute any of the methods, or a computer-readable recording medium which records the program in a non-transitory manner. The present invention may be implemented by combining parts of the configuration and the processing unless any technical discrepancy arises.

Advantageous Effects of Invention

According to the present invention, a failure related to luminance unevenness generated in an edge-lit type plane light source device can be inspected automatically and objectively. The present invention may be applied generally to hot spot inspection in various models of plane light source devices.

BRIEF DESCRIPTION OF DRAWINGS

FIG. 6A is a view of an example of an input image, and FIG. 6B is a view of an example of a light-emitting surface image extracted from the input image.

FIG. 7A shows an example of an image in an inspecting range, FIG. 7B shows an example of a one-dimensional luminance data, and FIG. 7C shows an example of smoothed luminance data (one-dimensional luminance profile).

DESCRIPTION OF EMBODIMENTS

The present invention relates to a technique for objectively (quantitatively) evaluating whether a failure called a hot spot is generated in an edge-lit type plane light source device and automatically inspecting for the presence/absence of the hot spot. The inspecting technique can be applied to in-line inspection in the final process in a manufacturing line for a plane light source device or acceptance inspection for a part (a plane light source device) by a manufacturer of a product which includes a plane light source device. Note that in the following description of the embodiments, the plane light source device is a backlight used in a liquid crystal display device by way of illustration, while the present invention may be applied to inspection of a plane light source device for any other use such as a lighting device and a digital signage device.

Hereinafter, a preferred embodiment of the present invention will be described with reference to the drawings. Note however that the configuration and operation of a device disclosed in the following description of the embodiment are described by way of illustration, and the same is not intended to limit the scope of the present invention.

First Embodiment (Plane Light Source Device)

Figure 1:
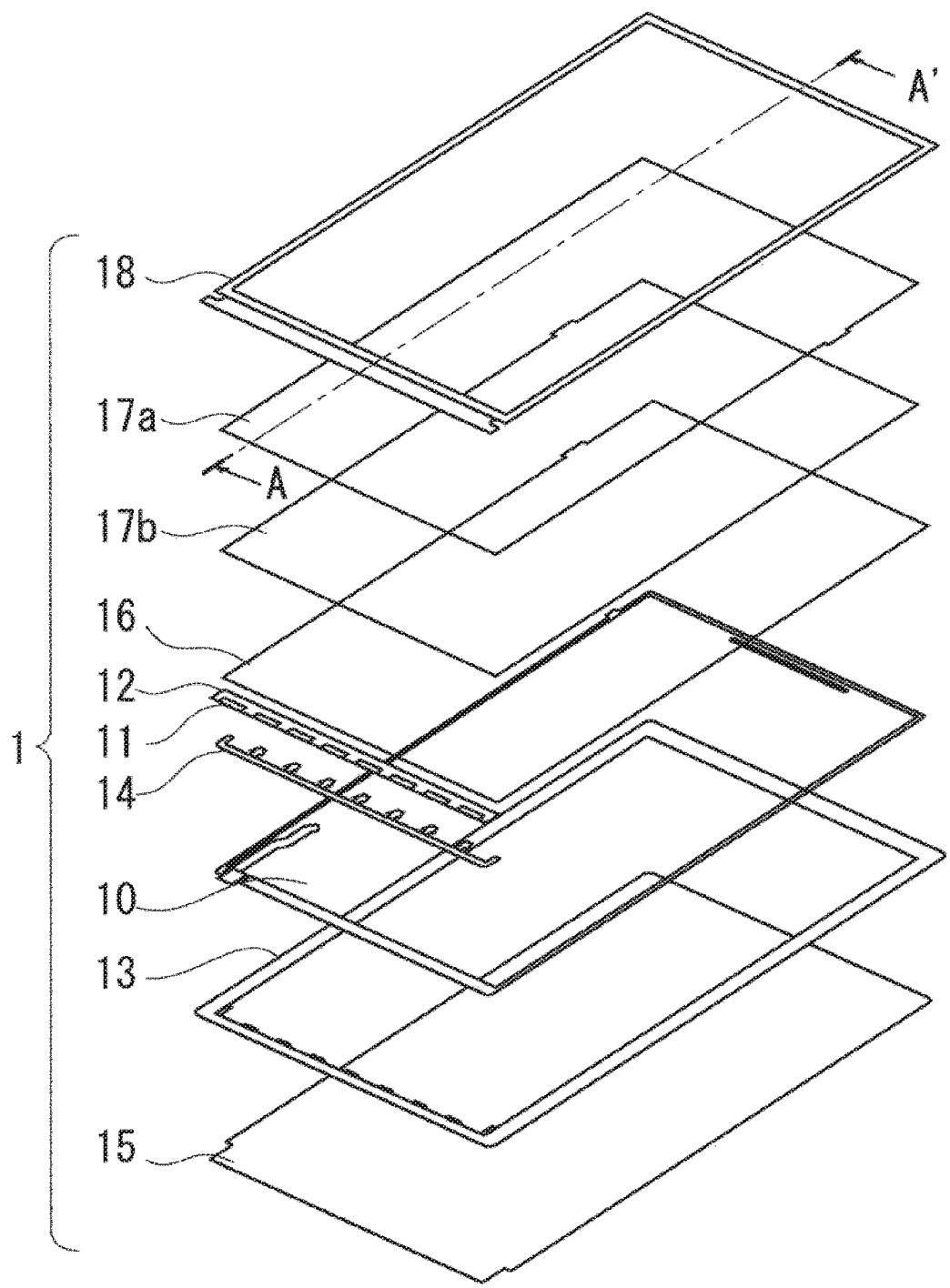
FIG. 1 is a perspective view illustrating the basic structure of a plane light source device.

FIG. 1 is a perspective view illustrating the basic configuration of a plane light source device 1. The plane light source device 1 includes a light-guiding panel (a light guide) 10, multiple light sources 11, a flexible printed circuit board (hereinafter as the "FPC") 12, a frame 13, and a fixing member 14. The plane light source device 1 further includes a reflecting sheet 15 provided on the lower surface side of the light-guiding panel 10. The plane light source device 1 includes a diffusion sheet 16, prism sheets 17*a* and 17*b*, and a light-shielding sheet 18 layered upon each other on the upper surface side of the light-guiding panel 10.

The light-guiding panel 10 has a substantially plate shape and is made of a translucent material such as a polycarbonate resin and a polymethyl methacrylate resin. The upper surface of the light-guiding panel 10 serves as a light-emitting surface (also referred to as a "light exit surface") from which light is emitted. The light-guiding panel 10 guides light introduced into the light-guiding panel 10 from the light sources 11 to the light emitting surface using total reflection, so that the entire light-emitting surface lights substantially uniformly.

The light source 11 is for example an LED light source which emits white light. Note however that the light source may be an LED light source other than a white LED light source or a light source other than an LED light source or may include light sources in multiple colors (such as RGB). The light source 11 is mounted to the FPC 12 and supplied with electric power from the FPC 12 to be driven. According to the embodiment, eight light sources 11 are aligned in a line at equal intervals along a short side (referred to as a "first side") of the light-emitting surface of the light-guiding panel 10.

The frame 13 is a member having an opening and a frame shape consisting of four sides. The frame 13 is made for example of a polycarbonate resin containing titanium oxide. The light-guiding panel 10 is fitted to the frame 13, and the inner peripheral surface of the frame 13 surrounds side surfaces which form the outer peripheral surface of the light-guiding panel 10. The frame 13 has a high reflectance and reflects light so that light in the light-guiding panel 10 does not leak from the outer peripheral surface of the light-guiding panel 10. A storing part for storing the light sources 11 is provided at one side of the frame 13, and the storing part is provided with a reflecting wall which reflects light from the light sources 11.

The fixing member 14 is provided for example at the lower surface of the FPC 12 to fix the FPC 12, the frame 13, and the light-guiding panel 10. The fixing member 14 is for example a length of double-side adhesive tape having upper and lower adhesive surfaces but it may be any other material. The reflecting sheet 15 is a flat and smooth sheet of a white resin sheet or a metal foil with a high reflectance and reflects light so that light inside the light-guiding panel 10 does not leak from the lower surface of the light-guiding panel 10. The diffusion sheet 16 is a translucent resin film and diffuses light emitted from the light-emitting surface of the light-guiding panel 10 so that the directivity of the light is increased. The prism sheets 17*a* and 17*b* are each a transparent resin film provided with a very fine triangular prism-shaped pattern on the upper surface thereof, collect light diffused by the diffusion sheet 16, and increases the luminance when the plane light source device 1 is seen from the upper surface side. The light-shielding sheet 18 is a black adhesive sheet having upper and lower adhesive surfaces. The light-shielding sheet 18 is frame-shaped and reduces light leakage.

(Hot Spot)

Figure 2:
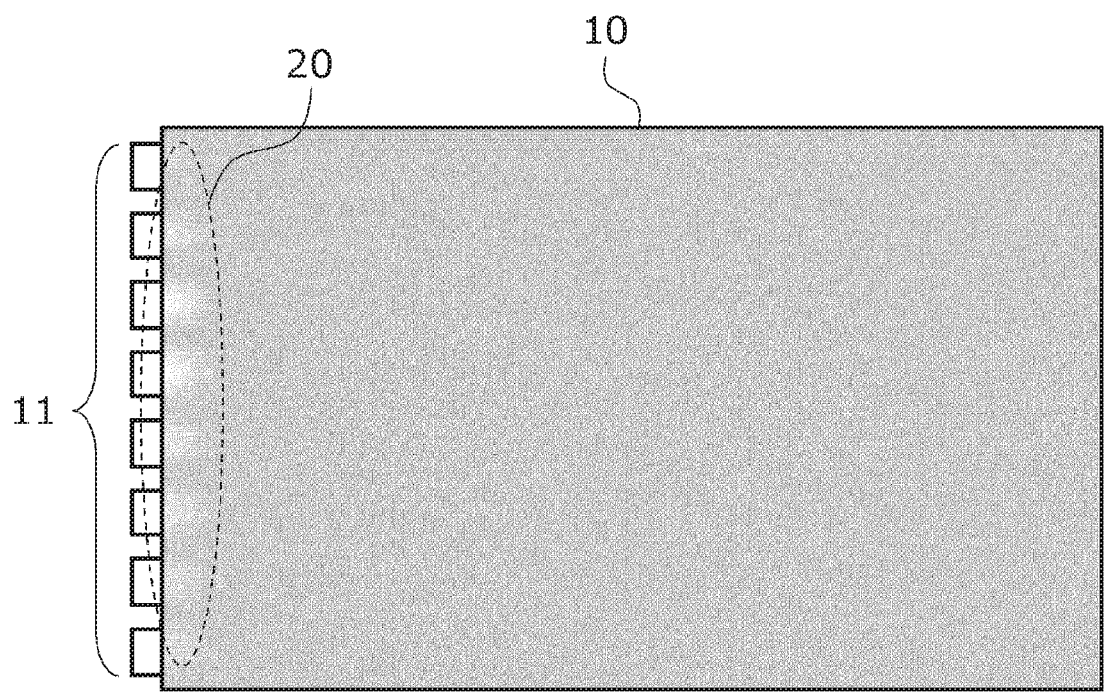
FIG. 2 is a view of an example of a hot spot.

The edge-lit type plane light source device shown in FIG. 1 may be encountered with a failure related to luminance unevenness attributable to various causes such as a defect in a mold for the light-guiding panel 10 or poor molding thereof, shifting during assembly of various components, and shifting in adhering sheets 15 to 18 together. In one such failure called a "hot spot," a brightness-darkness pattern corresponding to the arrangement of multiple light sources 11 appears at an end of the light-emitting surface along a first side (on the side provided with the light sources 11). FIG. 2 schematically illustrates an example of the hot spot. The hot spot 20 is generated as incoming light from the light sources 11 is immediately let out to the side of the light-emitting surface because of a defect in the light-guiding panel 10, and one of the most frequently occurring failures.

The inventor has analyzed a conventional sensory inspection procedure and results of inspection and gained the following findings.

(1) A hot spot is relatively bright in the vicinity of the position provided with the light sources 11 (where light enters the light-guiding panel 10 from the light sources 11) and relatively dark in a region between two adjacent light sources 11.

(2) A relatively bright region (a bright region) and a relatively dark region (a dark region) alternately exist in the arrangement direction of the multiple light sources 11 (i.e., along the first side).

(3) As the luminance difference between the bright region and the dark region is greater, the luminance unevenness is more noticeable.

According to the findings, the inventor has created a one-dimensional luminance profile representing change in the luminance value along the first side, designed an evaluation value for evaluating the amplitude of the luminance profile (referred to as a "hot spot evaluation value"), and quantified the occurrence degree of the hot spot on the basis of the evaluation value. The introduction of the evaluation value allows the occurrence degree of the hot spot to be understood more quantitatively and objectively, so that hot spot inspection dependent on the conventional sensory inspection can be automated. Hereinafter, the hot spot evaluation value according to the embodiment and a specific example of inspecting processing using the same will be described in detail.

(Inspecting Device)

Figure 3:
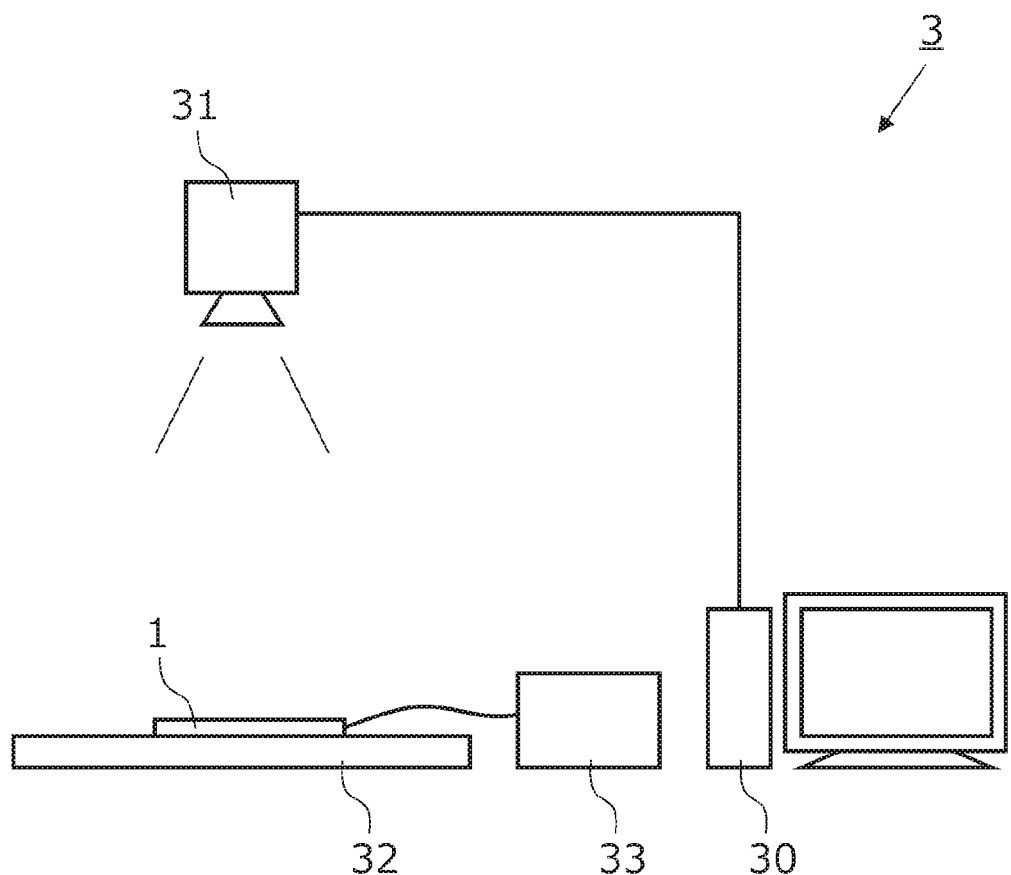
FIG. 3 is a view illustrating the hardware configuration of an inspecting device.

With referring to FIG. 3, the structure of the inspecting device 3 according to an embodiment of the present invention will be described. FIG. 3 shows the hardware configuration of the inspecting device 3. The inspecting device 3 quantitatively evaluates the occurrence degree of a hot spot in the plane light source device 1 and automatically determines the presence or absence of a hot spot to be removed as a defect.

As shown in FIG. 3, the inspecting device 3 substantially includes an information processing device (computer) 30, an imaging device 31, a stage 32, and a constant current power source 33. The information processing device 30 includes a general-purpose or dedicated computer which has a CPU (central processing unit) as a hardware processor, a memory as a main storage, a storage device for storing programs or data in a non-transitory manner (such as a hard disk and a flash memory), an input device (such as a mouse device, a keyboard, and a touch panel), a display device, an interface with the imaging device 31, and a network interface.

The imaging device 31 is a device which photographs the plane light source device 1 placed on the stage 32 and outputs a digital image. The imaging device 31 may be an optical system, an imaging element, or a digital camera which has an interface with the information processing device 30. Since the process is for the purpose of measuring the luminance of the plane light source device 1, the camera may be a monochrome camera if the plane light source device 1 is a monochromatic light source, and the camera is preferably a color camera if the plane light source device 1 is a multi-color light source device. The plane light source device 1 to be inspected is placed on the stage 32. The constant current power source 33 is a device which supplies the plane light source device 1 with electric power. Although not shown, the imaging device 31 and the stage 32 may be provided in a clean bench.

The size (the length and width) of the light-emitting surface or the light emission luminance may be different among different models of the plane light source devices 1. Therefore, depending on the size of the light-emitting surface to be inspected, the distance between the stage 32 and the imaging device 31 or the zoom of the imaging device 31 is preferably adjusted, so that the relation between one pixel of an image obtained by the imaging device 31 and an actual size on the light emitting surface is calibrated. The average luminance of an image obtained by the imaging device 31 is preferably calibrated by adjusting the exposure time of the imaging device 31 depending on the light emitting luminance of the test object. These kinds of calibration may be carried out automatically by the information processing device 30 or manually by an operator.

Figure 4:
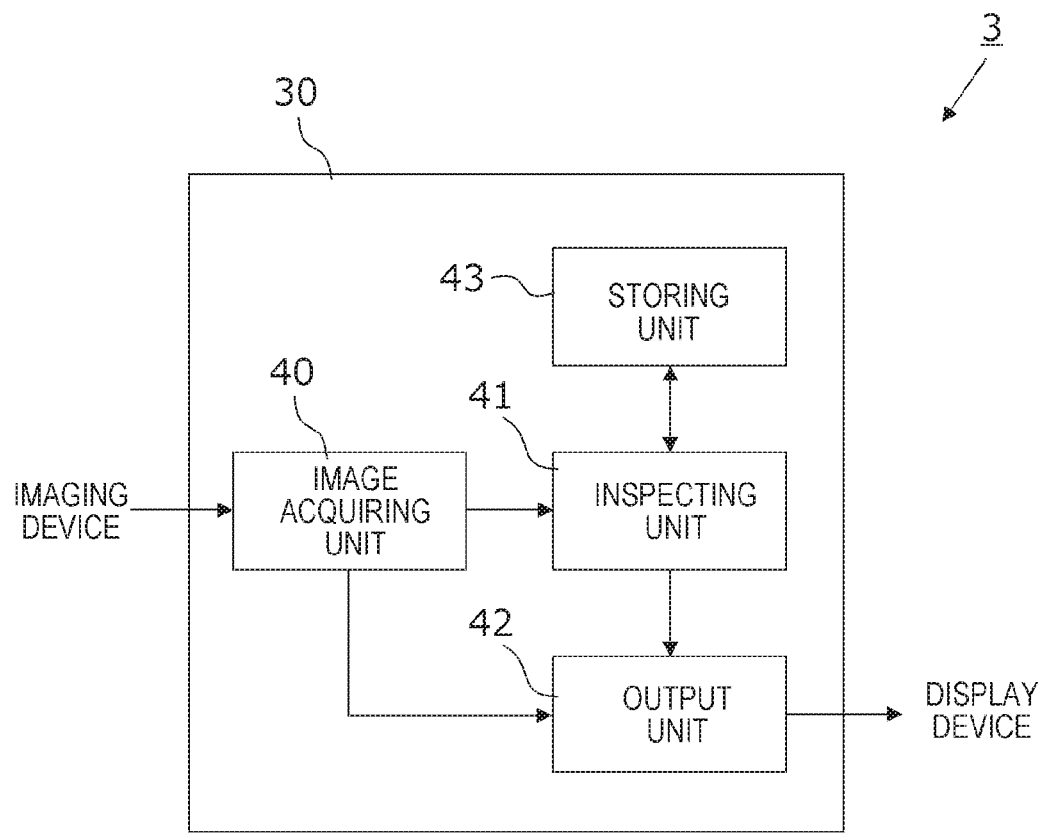
FIG. 4 is a block diagram illustrating functions related to hot spot inspecting processing by the inspecting device.

FIG. 4 is a block diagram showing functions related to hot spot inspecting processing by the inspecting device 3. The inspecting device 3 includes an image acquiring unit 40, an inspecting unit 41, an output unit 42, and a storing unit 43. The image acquiring unit 40 represents the function of obtaining image data acquired by photographing the plane light source device 1 for inspection from the imaging device 31. The inspecting unit 41 represents the function of analyzing the image data acquired by the image acquiring unit 40 and inspecting the presence or absence of a hot spot. The output unit 42 represents the function of outputting image data and information such as a result of inspection to the display device. The storing unit 43 represents the function of storing setting data such as threshold values used for inspecting processing. These functions will be described in detail.

The function shown in FIG. 4 is basically implemented as the CPU of the information processing device 30 loads necessary programs from the storing device and executes the programs. Note however that one or all of the functions may be substituted by a circuit such as an ASIC and an FPGA. One or all of these functions may be executed by another computer by using cloud computing or distributed computing techniques.

(Inspecting Processing)

Figure 5:
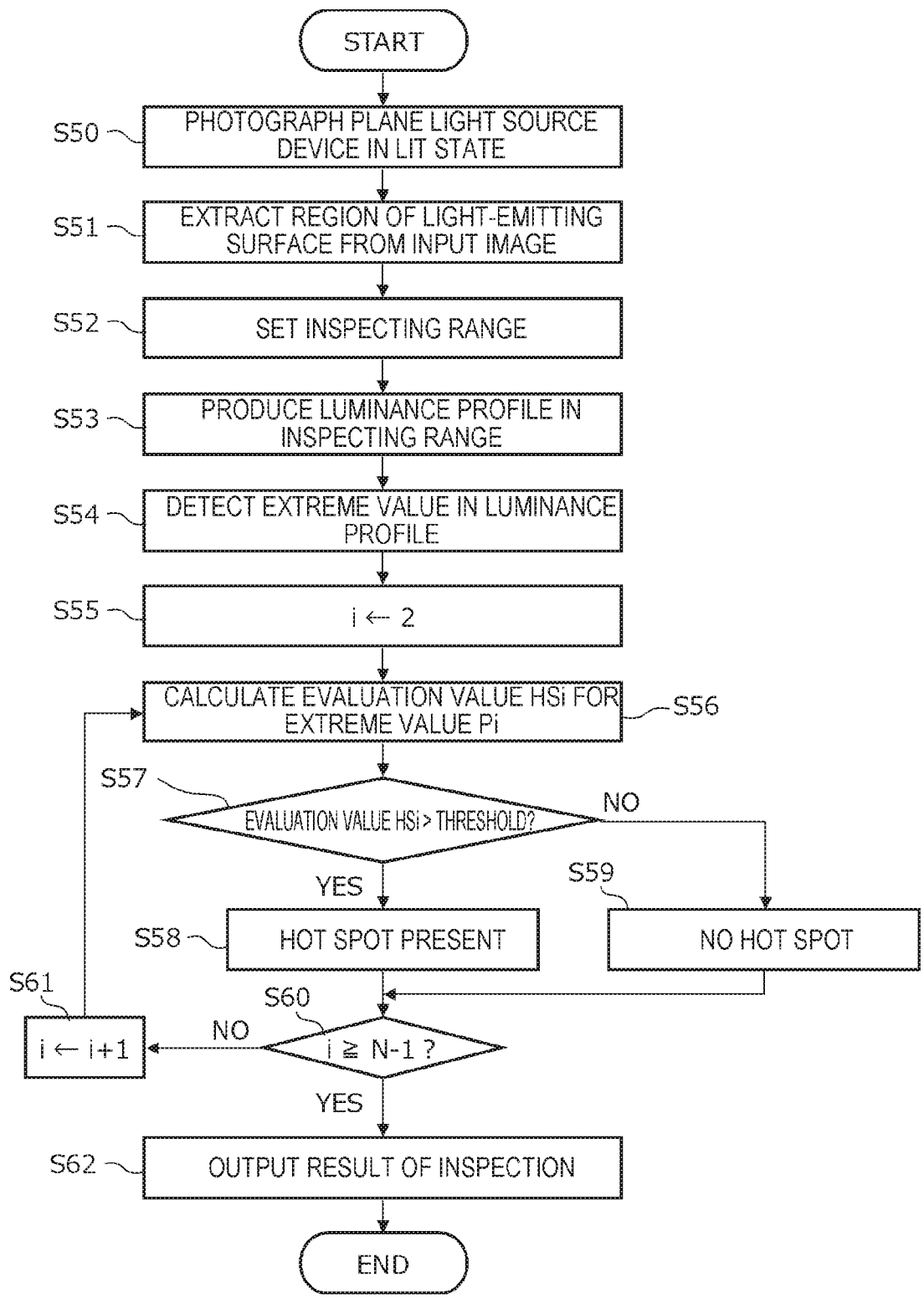
FIG. 5 is a flowchart for illustrating hot spot inspecting processing by the inspecting device.

With reference to FIG. 5, the flow of hot spot inspecting processing will be described. FIG. 5 is a flowchart for illustrating the hot spot inspecting processing by the inspecting device 3.

To start with, an inspector places the plane light source device 1 on the stage 32 in a prescribed position so that the light-emitting surface faces the side of the imaging device 31. The plane light source device 1 is connected to the constant current power source 33 to drive the light sources 11, and the plane light source device 1 is lit. Note that the test object is provided manually in the inspecting device 3 according to the embodiment, while operation such as introduction, positioning, and connection with the power source, and withdrawal of the test object may be automated.

In step S50, the imaging device 31 photographs the plane light source device 1 in the lit state, and the image acquiring unit 40 takes in image data from the imaging device 31. The resolution of the image is arbitrary while according to the embodiment, the image has a resolution of about 0.1 mm (an actual size on the light-emitting surface) per pixel.

In step S51, the image acquiring unit 40 extracts only the region of the light-emitting surface from the input image taken in step S50. Hereinafter, the image of the extracted region of the light-emitting surface will be referred to as a light-emitting surface image. FIG. 6A illustrates an example of an input image 60, and FIG. 6B illustrates an example of the light-emitting surface image 61 extracted from the input image 60. According to the embodiment, the light-emitting surface image 61 is generated so that the long sides of the light-emitting surface are parallel with the X-axis of the image.

The light-emitting surface region may be extracted by any method. For example, the image acquiring unit 40 may (1) binarize the original image, (2) remove noises in the background region (the region other than the light-emitting surface) by closing processing, and then (3) extract the contour of the light-emitting surface. Furthermore, when the contour of the light-emitting surface is inclined with respect to the image coordinate system, inclination correction (rotational correction) may be carried out. Alternatively, if the test object is positioned sufficiently accurately on the stage, it may only be necessary to cut a prescribed range from the original image.

Then, the inspecting unit 41 inspects the light-emitting surface image 61. To start with, in step S52, the inspecting unit 41 sets an inspecting range (also called a window) to the light-emitting surface image 61. The inspecting range is a local area used for failure detection and evaluation calculation and set in a position in the light-emitting surface image 61 in which a failure may appear. A hot spot appears at the end of the light source side, and therefore as shown in FIG. 6B, the inspecting range 62 may be set along the left end of the light-emitting surface image 61. Hereinafter, an exemplary case in which the inspecting range 62 in a square having an X-width of 15 pixels (which corresponds to about 1.5 mm) and a Y-width of 700 pixels (which corresponds to about 70 mm) will be described. Note however that the size or shape of the inspecting range 62 are arbitrary and may be designed, as appropriate, according to the size of the light-emitting surface of a test object or a hot spot appearing range.

In step S53, the inspecting unit 41 produces a one-dimensional luminance profile representing change in the luminance value in the Y-direction within the inspecting range 62 on the basis of the image in the inspecting range 62. For example, the inspecting unit 41 calculates the average of the luminance values (the pixel values) for each row (which refers to 15 pixels arranged in the X-direction) of the image within the inspecting range 62, and obtains one-dimensional luminance data (data on the luminance average value for 700 rows). FIG. 7A shows an example of the image within the inspecting range 62, and FIG. 7B shows an example of one-dimensional luminance data. The ordinate of the graph in FIG. 7B indicates the pixel position in the Y-direction within the inspecting range 62, and the abscissa represents the average luminance value. Then, the inspecting unit 41 reduces noises by smoothing the one-dimensional luminance data. FIG. 7C shows an example of the smoothed luminance data. As can be seen, a high frequency noise is removed by smoothing. According to the embodiment, the smoothed luminance data is referred to as a luminance profile.

In step S54, the inspecting unit 41 detects extreme values (a maximum value and a minimum value) in the luminance profile. A known algorithm can be used to detect an extreme value from a one-dimensional data string, and a detailed description will not be provided. As shown in FIG. 7C, it is assumed in this example that 15 extreme values P1 to P15 (eight maximum values and seven minimum values) are detected.

Then, a hot spot evaluation value is calculated for each of the detected extreme values. In the following description, the total number of detected extreme values is N, and the numeral for an extreme value of interest is i. The inspecting unit 41 substitutes 2 to i in step S55 and calculates a hot spot evaluation value for an extreme value Pi in step S56. According to the embodiment, the hot spot evaluation value $HS_i$ for the extreme value Pi is calculated from the following expression. Note that $val_i$ is the luminance value of the extreme value Pi, and abs( ) is a function which takes an absolute value.

$$HS_i = \frac{\text{abs}(val_i - val_{i-1}) + \text{abs}(val_i - val_{i+1})}{val_{i-1} + 2 \times val_i + val_{i+1}} \quad [\text{Math. 2}]$$

According to the evaluation expression, an evaluation value dependent on the size (AC component) of change in the luminance value rather than dependent on the size (DC component) of the luminance value itself can be obtained. Therefore, relative change in the luminance value may be mainly evaluated on the basis of the evaluation value $HS_i$, and therefore the occurrence degree of a hot spot can be quantified regardless of the level of a reference luminance value (which is a luminance value in a state without unevenness). Therefore, the evaluating method according to the embodiment may be generally applied to various models of the plane light source devices with different reference luminance values.

In step S57, the inspecting unit 41 compares the hot spot evaluation value $HS_i$ to a determination threshold value. The determination threshold value is used to determine the presence or absence of a hot spot, and may be predetermined for example on the basis of a result of sensory inspection or a result of experiments. The inspecting unit 41 determines that "there is a hot spot generated in the position of the extreme value Pi" if the hot spot evaluation value $HS_i$ is greater than the determination threshold value (step S58) and otherwise determines that "there is no hot spot in the position of the extreme value Pi" (step S59).

The inspecting unit 41 repeats evaluation from steps S56 to S59 while incrementing i by one until i≥N−1 is established (steps S60 and S61). In this way, the presence/absence of a hot spot is inspected in the positions of extreme values P2 to P14. Note that according to the embodiment, a hot spot evaluation value is calculated from three extreme values, i.e., the extreme value Pi of interest and extreme values Pi−1 and Pi+1 on both sides thereof, and therefore an evaluation value is not obtained for the extreme values P1 and P15 at the ends. However, the evaluation value may be calculated from the extreme value Pi of interest and the extreme value Pi−1 or Pi+1, and in the case, an evaluation value may be calculated for all the extreme values P1 to P15.

Figure 8:
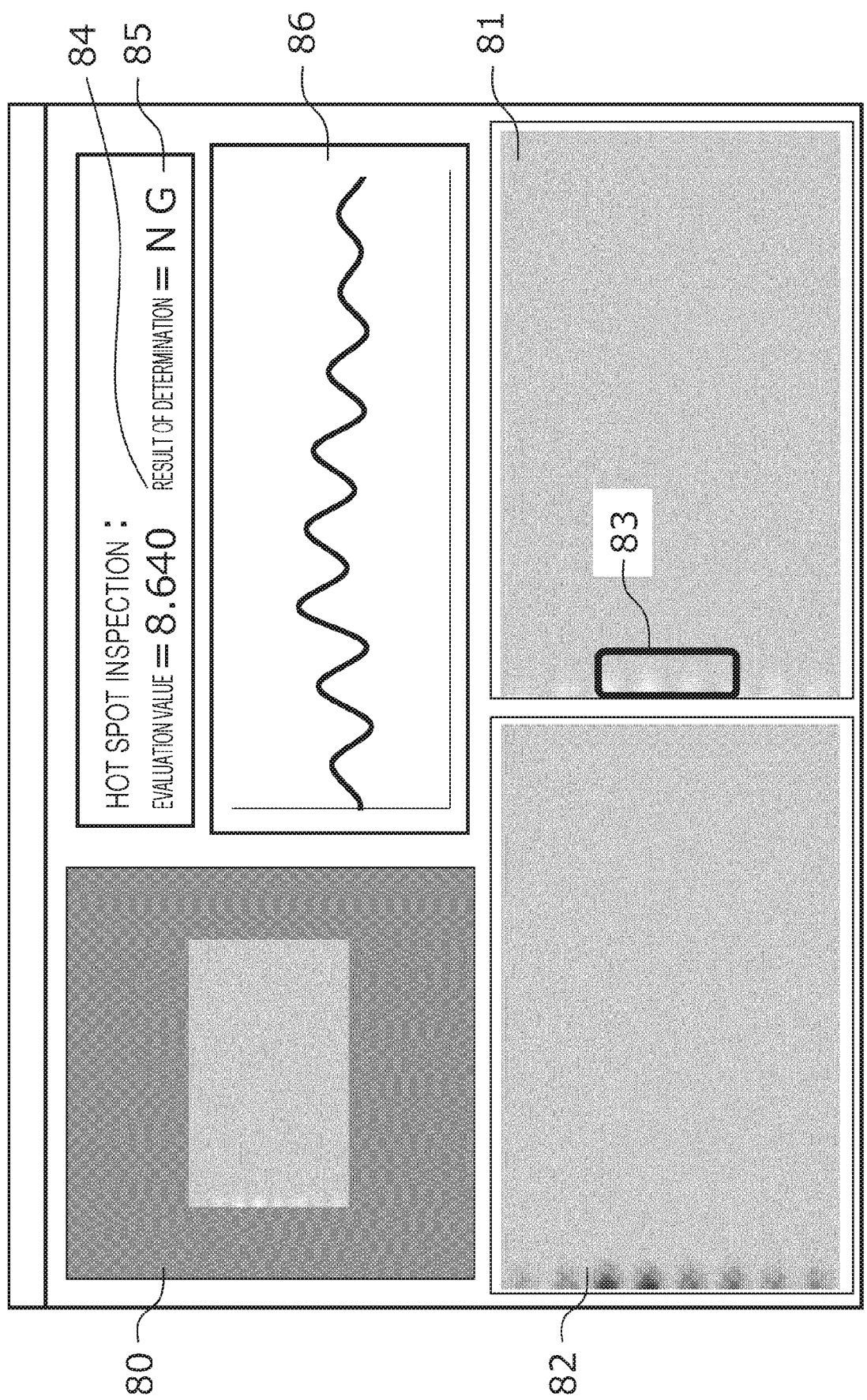
FIG. 8 is a view of an example of an output screen image which indicates a result of inspection.

In step S62, the output unit 42 produces a screen image for outputting information obtained by the inspecting unit 41 and outputs the screen image to the display device. FIG. 8 illustrates an example of the output screen image as a result of inspection. The output screen image includes an input image 80 taken from the imaging device 31, a light-emitting surface image 81 cut from the input image 80, and an image 82 (such as a pseudo color image) processed to make luminance unevenness more noticeable with respect to the light-emitting surface image 81. The light-emitting surface image 81 is superposed with information 83 indicating a position in which a hot spot appears (for example information indicating a position in which the hot spot evaluation value exceeds the determination threshold value). The screen also shows a maximum value 84 for the hot spot evaluation value, its determination result 85, and a luminance profile 86.

Using the inspecting device 3 according to the embodiment, an evaluation value representing the occurrence degree of a hot spot is calculated on the basis of a photographed image of the light-emitting surface of the plane light source device 1, and the presence/absence of a hot spot can be determined on the basis of the evaluation value. Therefore, objective and automatic inspection for hot spots may be performed. In addition, with the inspection algorithm according to the embodiment, an evaluation value for evaluating the difference between adjacent extreme values in the one-dimensional luminance profile is used, and evaluation independent of the pitch of a brightness-darkness pattern may be carried out. Therefore, the inspection algorithm according to the embodiment may be generally applied to various models of plane light source devices among which among which the size of the light-emitting surface, the number, pitch, and the arrangement of light sources, and the like are different.

With the inspection algorithm according to the embodiment, three values, i.e., the extreme value of interest and the extreme values on both sides thereof are used for calculation. In this way, if the luminance in a region changes as if a bright part is sandwiched between dark parts or a dark part is sandwiched between bright parts, the region can be evaluated as a candidate for a hot spot, and the occurrence degree of a hot spot can be evaluated highly accurately.

Since the result of inspection shown in FIG. 8 is output, the inspector can immediately determine the presence/absence of a hot spot or whether the plane light source device 1 is good or defective. The hot spot evaluation value is also output, and therefore the reason for the result of determination can be checked, so that convincingness and objectivity about the result of determination may improve. The light-emitting surface image 81 is superposed with the information 83 which indicates the position of a hot spot, which allows the inspector to grasp the position of interest having the hot spot intuitively and easily, which is also useful in checking the actual product. More specifically, the luminance profile 86 is also displayed, so that the state of the hot spot such as the state of a brightness-darkness pattern and the luminance difference between the extreme values may be understood.

Second Embodiment

Now, with reference to FIGS. 9 and 10, a second embodiment of the present invention will be described. The embodiment is different from the first embodiment in that during hot spot evaluation, the distance between adjacent extreme values is taken into consideration. The embodiment is otherwise identical to the first embodiment, and therefore only features and processing specific to the second embodiment will be described.

Figure 9:
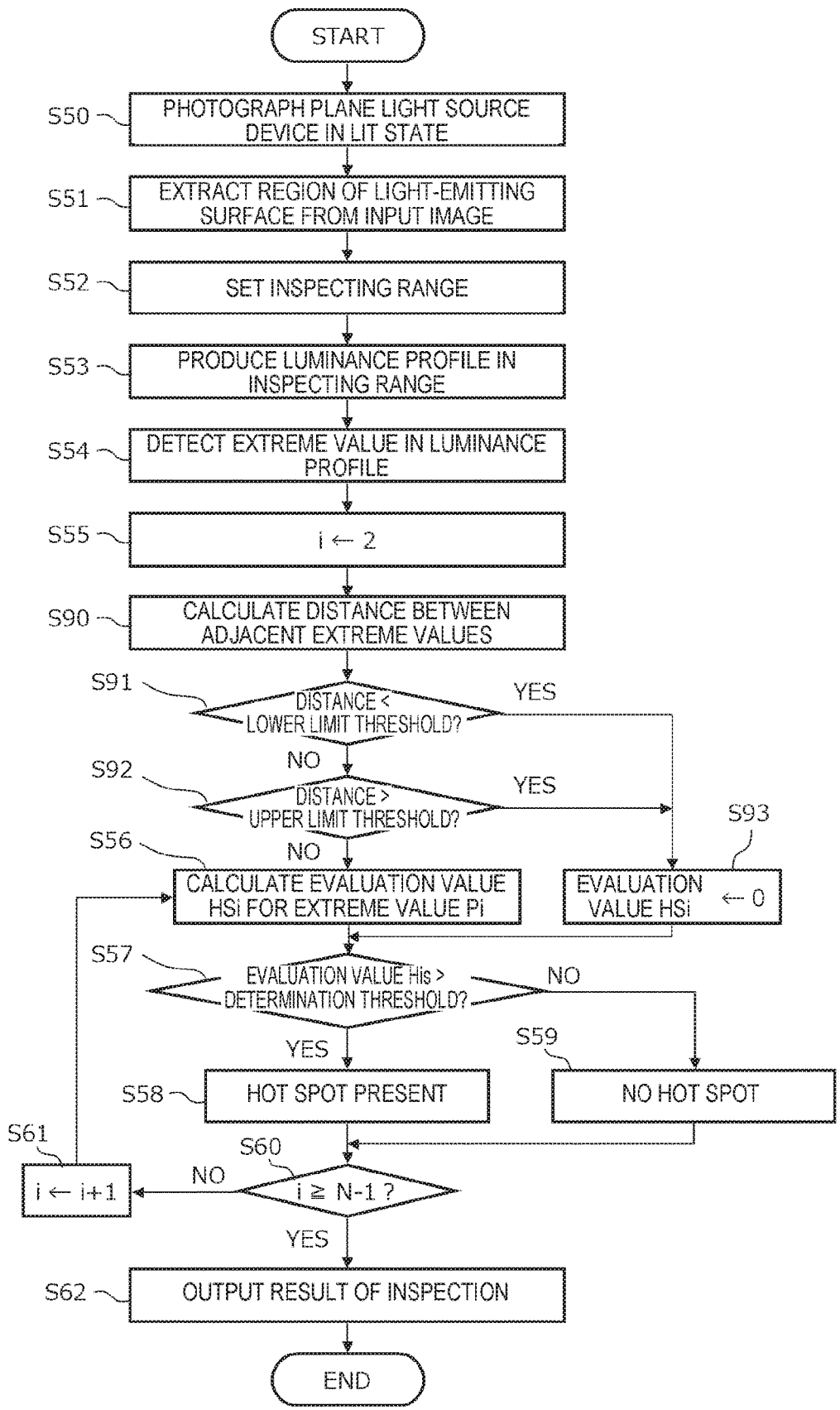
FIG. 9 is a flowchart for illustrating hot spot inspecting processing according to a second embodiment of the invention.

FIG. 9 is a flowchart for illustrating hot spot inspecting processing according to the second embodiment. To start with, a luminance profile is produced and extreme values are detected by the processing from steps S50 to S54. The processing up to this point is identical to the processing according to the first embodiment (FIG. 5). FIG. 10 shows an example of a luminance profile and detected extreme values. In this example, it is assumed that 13 extreme values P1 to P13 are detected.

The inspecting unit 41 substitutes an initial value 2 to i in step S55. In step S90, the inspecting unit 41 calculates the distance La between an extreme value Pi and an extreme value Pi−1 and the distance Lb between the extreme value Pi and an extreme value Pi+1. If at least one of the distances La and Lb is smaller than a lower limit threshold value TH1 (YES in step S91), the inspecting unit 41 does not calculate a hot spot evaluation value for the extreme value Pi and sets the evaluation value $HS_i$ to zero (or no value) (step S93). If at least one of the distances La and Lb is greater than an upper limit threshold value TH2 (YES in step S92), the inspecting unit 41 does not calculate a hot spot evaluation value for the extreme value Pi and sets the evaluation value $HS_i$ to zero (or no value) (step S93).

The lower limit threshold value is provided to exclude, from calculation of a hot spot evaluation value, an extreme value attributable to a cause other than a hot spot or an extreme value attributable to simple noise in measurement. Therefore, the lower limit threshold value may be set to a value smaller than an expected minimum value for the light source pitch (such as a value about 50% to 90% of the expected minimum value). Meanwhile, the upper limit threshold value is provided to exclude, from calculation of a hot spot evaluation value, an extreme value attributable to a cause other than a hot spot. Therefore, the upper limit threshold value may be set to a value greater than an expected maximum value for the light source pitch (such as a value not less than 120% of the expected maximum value). The lower limit threshold value and the upper limit threshold values may be previously set in the storing unit 43 or input by a user (an inspector).

Figure 10:
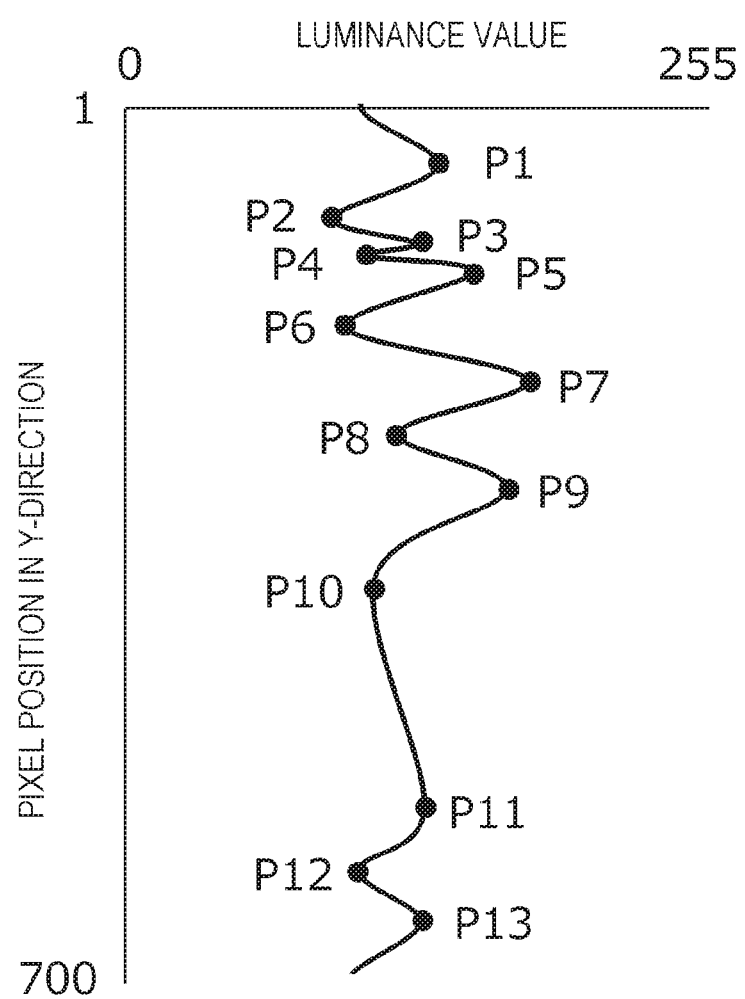
FIG. 10 shows an example of a one-dimensional luminance profile according to the second embodiment.

In the example shown in FIG. 10, the distances among the extreme values P2 to P5 are clearly smaller than the light source pitch, while the distance between the extreme values P10 and P11 is greatly larger than the light source pitch, and therefore the presence of a hot spot should not be determined for any of these extreme values. In this way, by the method according to the embodiment, the evaluation values for these extreme values are zero (or no value) regardless of the luminance difference between the extreme values, and therefore it is determined as a result that there is no hot spot. Therefore, the determination accuracy may improve even more than the first embodiment.

<Other Matters>

The description of the embodiments is only for the purpose of illustrating the present invention. The invention is not limited by the above specific embodiments, and various modifications can be made within the scope of technical ideas of the invention. For example, in the description of the embodiments, the plane light source device having a rectangular light-emitting surface is illustrated by way of example, while the shape of the light-emitting surface may be any other shape than the rectangular shape. The hot spot evaluation value is only an example, and if the value allows the luminance difference between extreme values in a luminance profile to be evaluated, the evaluation value may be designed in any other way.

REFERENCE SIGNS LIST

1: Plane light source device
10: Light-guiding panel, 11: Light source, 20: Hot spot
3: Inspecting device, 30: Information processing device, 31: Imaging device, 32: Stage, 33: Constant current power source
40: Image acquiring unit, 41: Inspecting unit, 42: Output unit,
43: Storing unit
60: Input image, 61: Light-emitting surface image, 62: Inspecting range

The invention claimed is:

1. An inspecting device for inspecting for a failure related to luminance unevenness in a light-emitting surface of a plane light source device, the plane light source device comprising an edge-lit type plane light source device having multiple light sources arranged along a first side of the light-emitting surface and a light-guiding panel which guides light emitted from the multiple light sources to the light-emitting surface,
    the failure comprising a brightness-darkness pattern corresponding to the arrangement of the multiple light sources appearing at an end of the light-emitting surface along the first side,
    the inspecting device comprising a processor configured with a program to preform operations comprising:
    operation as an image acquiring unit which acquires a light-emitting surface image as a photographed image of the light-emitting surface;
    operation as an inspecting unit configured to
        set an inspecting range comprising a part of the light-emitting surface image corresponding to the end of the light-emitting surface,
        generate a one-dimensional luminance profile representing change in a luminance value from an image of the inspecting range, the change in the luminance value represented by the one-dimensional luminance profile comprising a change in a luminance value along the first side in the inspecting range,
        detect an extreme value in the change in the luminance value represented by the one-dimensional luminance profile,
        calculate an evaluation value based on a difference in the luminance value between adjacent extreme values, and
        determine the presence or absence of the failure by comparing the evaluation value to a predetermined threshold value; and
    operation as an output unit which output information obtained by the inspecting unit.

2. The inspecting device according to claim 1, wherein the processor is configured with the program such that operation as the inspecting unit comprises calculating the evaluation value for an extreme value of interest on the basis of the extreme value of interest and two adjacent extreme values.

3. The inspecting device according to claim 2, wherein the processor is configured with the program such that operation as the inspecting unit comprises calculating the evaluation value HS for the extreme value of interest by the following expression:

$$HS = \frac{\text{abs}(val2 - val1) + \text{abs}(vas2 - val3)}{val1 + 2 \times val2 + val3}$$

where the extreme value of interest is val2, and the two adjacent extreme values are val1 and val3.

4. The inspecting device according to claim 1, wherein, the processor is configured with the program such that operation as the inspecting unit comprises, when the distance between the adjacent extreme values is greater than an upper limit threshold value, not calculating the evaluation value for any one of the adjacent extreme values or determining that the failure does not exist in the position of any one of the adjacent extreme values.

5. The inspecting device according to claim 1, wherein, the processor is configured with the program such that operation as the inspecting unit comprises, when the distance between the adjacent extreme values is smaller than a lower limit threshold value, not calculating the evaluation value for any one of the adjacent extreme values or determining that the failure does not exist in the position of any one of the adjacent extreme values.

6. The inspecting device according to claim 1, wherein the processor is configured with the program such that operation as the output unit comprises outputting the evaluation value and a result of determination on the presence or absence of the failure.

7. The inspecting device according to claim 1, wherein the processor is configured with the program such that operation as the output unit comprises outputting an image obtained by superposing the light-emitting surface image or an image obtained by processing the light-emitting surface image with information representing the position in which the failure appears.

8. The inspecting device according to claim 1, wherein the processor is configured with the program such that operation as the output unit comprises outputting a luminance profile in the inspecting range.

9. A method for inspecting for a failure related to luminance unevenness in a light-emitting surface of a plane light source device, the plane light source device comprising an edge-lit type plane light source device having multiple light sources arranged along a first side of the light-emitting surface and a light-guiding panel which guides light emitted from the multiple light sources to the light-emitting surface,
the failure comprising a brightness-darkness pattern corresponding to the arrangement of the multiple light sources appearing at an end of the light-emitting surface along the first side,
the inspecting method comprising:
obtaining a light-emitting surface image as a photographed image of the light-emitting surface;
setting an inspecting range comprising a part of the light-emitting surface image corresponding to the end of the light-emitting surface;
generating a one-dimensional luminance profile representing change in a luminance value from an image of the inspecting range, the change in the luminance value represented by the one-dimensional luminance profile comprising a change in a luminance value along the first side in the inspecting range;
detecting an extreme value in the change in the luminance value represented by the one-dimensional luminance profile;
calculating an evaluation value based on the difference in the luminance value between adjacent extreme values;
determining the presence or absence of the failure by comparing the evaluation value to a predetermined threshold value; and
outputting a result of inspection.

10. A non-transitory computer-readable storage medium storing a program for allowing a computer to execute the steps in the inspecting method according to claim 9.

* * * * *